Dec. 30, 1952     A. D. SANDS     2,623,725
SAFETY VALVE

Filed Oct. 30, 1946     3 Sheets-Sheet 1

INVENTOR
Asa D. Sands
BY
ATTORNEYS

Dec. 30, 1952 A. D. SANDS 2,623,725
SAFETY VALVE
Filed Oct. 30, 1946 3 Sheets-Sheet 2
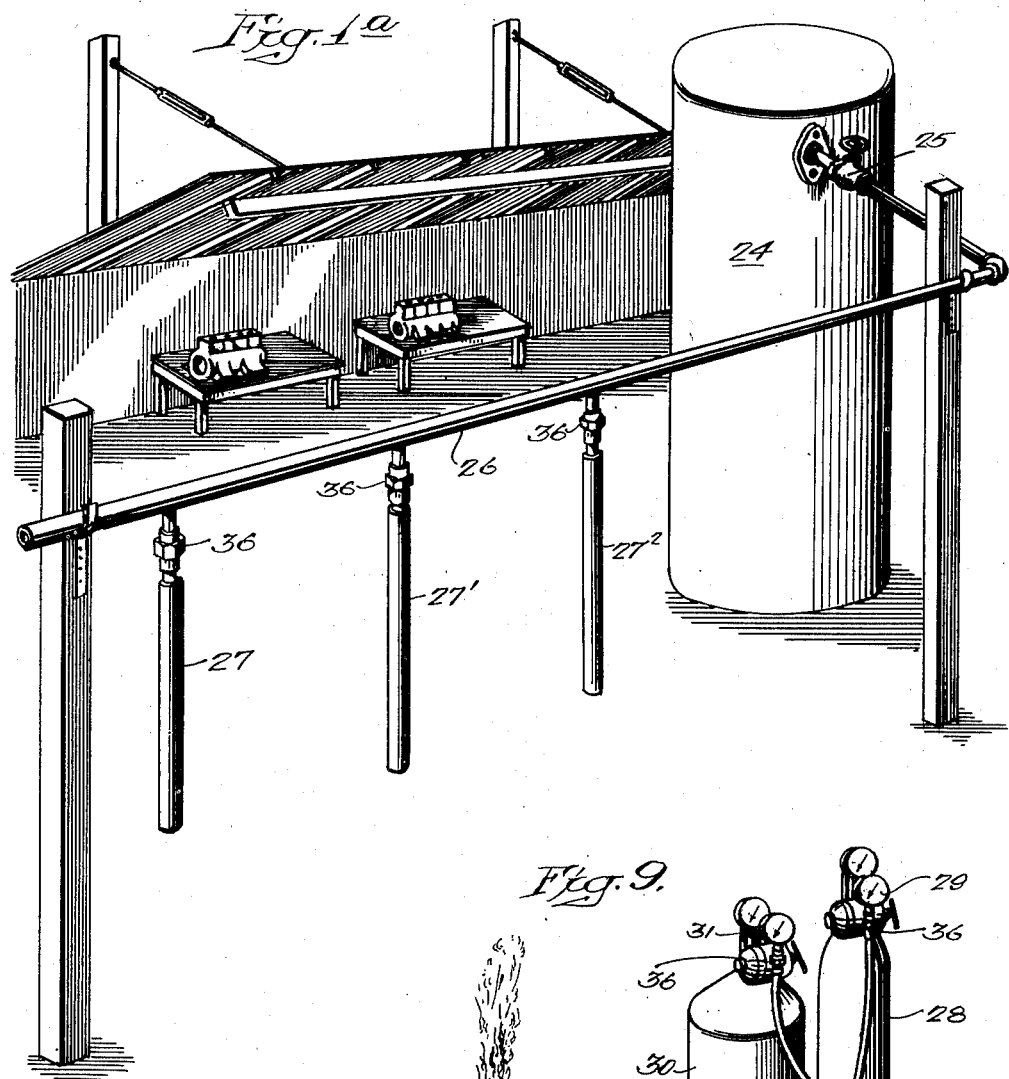
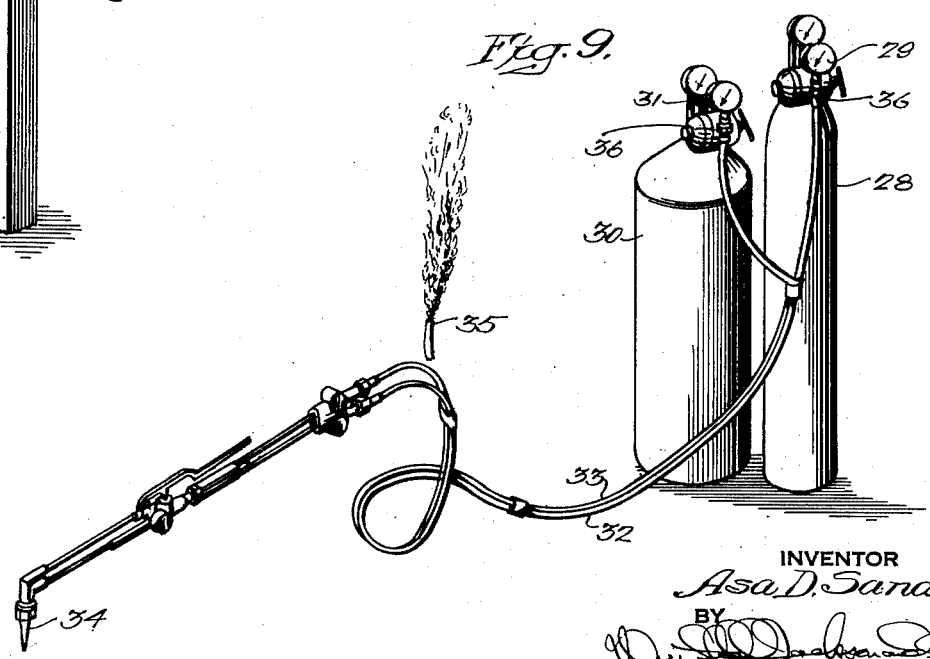
INVENTOR
Asa D. Sands.
BY
ATTORNEYS Dec. 30, 1952          A. D. SANDS          2,623,725
SAFETY VALVE
Filed Oct. 30, 1946          3 Sheets-Sheet 3
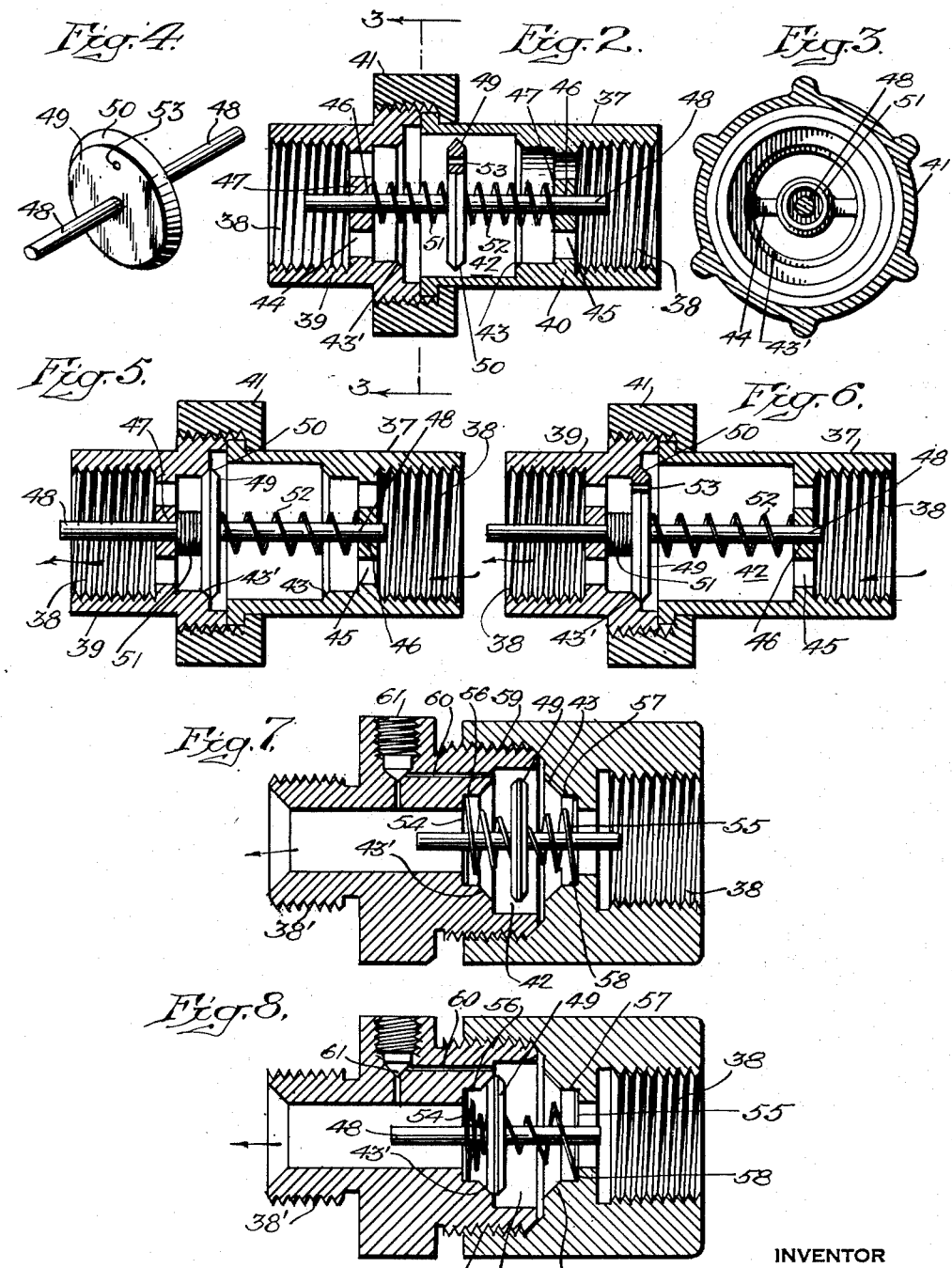
INVENTOR
Asa D. Sands.
BY
ATTORNEYS Patented Dec. 30, 1952

2,623,725

UNITED STATES PATENT OFFICE 2,623,725

SAFETY VALVE

Asa D. Sands, Camden, N. J.

Application October 30, 1946, Serial No. 706,650

1 Claim. (Cl. 251—118)

My invention relates to a safety system for gas and air pressure conduits incident to operation of automatic tools, distribution of gas for welding, distribution of gas for heating and chemical uses and the like.

The present application is a continuation in part of my copending application for Safety Valves, Serial No. 551,710 filed August 29, 1944, now abandoned.

The main purpose of my invention is to avoid death or injury to workers who are likely to be placed in danger in case of the unexpected bursting, cutting or other leakage of a gas or air conduit, especially to those in precarious positions as on scaffolds, decking or in compartments, when using air tools in ship building or the like, or those engaged in welding; or maintenance or operation of combustion or chemical lines.

A further purpose is to avoid whipping of broken flexible lines containing gas or air.

A further purpose is to employ a safety valve which will automatically restore operation without location of the valve when the leak is repaired.

A further purpose is to provide different resultant pressures upon seating a safety valve in opposite directions so that in case of change in pressure, flow or other conditions the valve can meet the different conditions simply by reversal without disassembly.

A further purpose is to provide means for cutting off a by-pass of a safety valve in case the character of gas makes it unsafe to use the by-pass.

Further purposes appear in the specification and in the claims.

In the drawings I have chosen to illustrate a few only of the embodiments in which my invention may appear, choosing the forms shown from the standpoint of convenience in illustration, satisfactory operation and clear demonstration of the principles involved.

Figure 1a illustrates a variation of Figure 1 applied to a permanent piping installation.

Figure 2 is a longitudinal sectional view of my improved safety valve.

Figure 3 is a transverse sectional view taken on the line 3—3 of Figure 2.

Figure 4 is a detailed perspective view of the valve element shown in Figures 2 and 3.

Figure 5 is a view similar to Figure 2 but showing the valve element in position corresponding to closure.

Figure 6 is a view similar to Figures 2 and 5 showing a modification.

Figure 7 is a longitudinal central sectional view of a modified valve similar to Figures 2, 5 and 6.

Figure 8 is a view similar to Figure 7 showing the valve in a different position.

Figure 9 is a fragmentary perspective view of my invention applied to a welding system.

Figure 1:
Figure 1 is a perspective view of an air compressor and air line system with an automatic tool at work, embodying my safety valve, but illustrating an assumed condition in case the safety valve did not work or was not employed.

Describing in illustration but not in limitation and referring to the drawings:

In the prior art there have frequently been industrial accidents due to the unexpected breaking, cutting or leaking of air or gas hoses, pipes or the like. This condition is hazardous in a number of ways. When the particular line of conduit is carrying compressed air for drills or other tools as in shipbuilding, the broken end of a flexible hose or other conduit suddenly whips as indicated in Figure 1 at 20 where it is assumed that a hose 21 from an air compressor 22 to an air drill 23 may suddenly break at the location 20. This whipping end may strike against a man with great force knocking him off a scaffolding or into the path of machinery, cranes or the like, or may startle him so that he loses his balance and falls or is otherwise hurt. In the case of a simple system involving a single hose as shown in Figure 1, the problem of location of the source of difficulty and correction is rather simple, but in the case of a more complex system as shown in Figure 1a where there is a tank or other source of compressed air or the like 24 distributing through a main valve 25 to a header 26 connecting to numerous laterals 27, 27', 27², each of which has one or more air tools, it will be understood that particularly in shipbuilding where hoses become crossed and tangled and are taken into narrow and remote compartments, a very considerable economic loss is involved in the case of unexpected leakage, because, it is necessary to shut off the main valve 25 until the particular lateral causing trouble can be traced down and either cut off or the leak repaired. This is made all the more necessary because the blast of air coming out from the broken end at high pressure in a small compartment is both unpleasant and dangerous, and the workers usually, immediately signal for shut-offs of the system until the difficulty can be localized.

The hazards suggested above in connection with air tools and the like are greatly accentuated when explosive, combustible or other dangerous gases are being employed, for example in welding, fuel combustion and chemical processes.

To suggest this condition, I show in Figure 9 a welding equipment consisting of a suitable oxygen tank 28 having suitable valves and gages 29 and a fuel tank 30 having suitable valves and gages 31, communicating through respective hoses 32 and 33 to a torch or the like 34.

Breakage for example at 35, particularly in the fuel line, will not only cause the line to whip and possibly cause damage or injury, but may flood a compartment or other space with explosive or combustible gas before the main control valve appropriate to the broken line can be cut off.

In order to correct the above difficulty I interpose between the source and the point of distribution a safety valve 36 which normally remains open, but which closes in case of abnormal flow incident to unexpected leakage, and preferably opens automatically again when the difficulty has been overcome. My valve is shown in Figure 1 adjacent the compressor, in Figure 1a applied to each of the individual laterals and in Figure 9 applied to the oxygen and fuel lines as they leave the valves and gages at the tanks.

The valve as shown in Figures 2 to 5 has a suitably circular body 37 provided at the opposite ends with threaded connections 38 for suitable fittings, and suitably formed with opposite end sections 39 and 40 joined by a union 41. An interior valve space 42 is provided by the cooperating sections, and on each section (or permissibly on the only one section as shown in Figure 6) I provide a central valve seat 43 or 43', oppositely facing and in line.

Spiders 44 and 45 extend across the valve casing at opposite ends of the valve space 42 and toward the ends of the casing with respect to the valve seats, and the spiders are provided with centrally cooperating guiding openings 46 and spring abutments 47.

The stem 48 extends longitudinally through the openings 46 from end to end of the valve casing and is longitudinally slidable in the guiding openings 46 provided by the spiders.

On the stem 48 I provide a valve element 49, suitably having oppositely facing valve portions 50 (except in Figure 6 where only one is necessary) to cooperate with the respective valve seats. Between the valve element and the spring abutment at each end, I provide valve springs 51 and 52, chosen to exert a force on compression sufficient to keep the valve in open position during normal flow under the particular pressure and volume of flow, but insufficient to prevent closure under abnormal flow incident to unexpected leakage. The springs 51 and 52 are preferably chosen with slightly different pressures, so that if it is decided to operate the line at different pressure it will not be necessary to disassemble the valves and replace springs, but the valves can simply be reversed end for end to bring into play the spring of the appropriate stiffness.

By this procedure it is possible to cover a wide range of operating conditions from a single valve without tedious disassembly and replacement of parts.

When the valve closes it is desirable to permit it to open automatically so that after location and repair of the leakage it will not be necessary to search out and open the valve. With this purpose in view, a by-pass port 53 is extended from end to end through the valve element, permitting slight leakage when the valve is closed toward the direction of flow.

In the form as shown in Figures 7 and 8 the spiders are dispensed with, and the valve element is mounted or held floating entirely by the springs 54 and 55 which are suitably of conical form engaging in recesses 56 and 57 of the casing on opposite sides of the valve space 42, and beyond the valve seats 43, 43'. Thus it is seen that the ends 58 of the springs which engage the valve element 49 not only urge it longitudinally but locate it centrally and prevent the necessity to rigidly guide the valve element.

In this form the casing has been slightly modified to provide an external thread at 38' at one end, and the union has been dispensed with, the sections of the valve casing being joined by cooperating threads at 59.

In the form of Figures 7 and 8, no by-pass opening 53 is provided in the valve element but a separate by-pass opening 60 extends through the valve casing and is controlled by an additional needle valve 61. This permits closing off of the by-pass 60 in case an explosive or other dangerous gas is used which would be dangerous to allow to leak through the by-pass after the valve is closed. Thus with the form of Figures 7 and 8 it is possible to apply the valve without alteration in its structure either to air, to non-explosive gases, and to explosive gases.

In operation the valve remains in the position shown in Figures 2 and 7 as long as the system is functioning properly. In case of leakage, if the gas is entering at the right and flowing out the left of Figures 5, 6 and 8, the valve will seat to the left, cutting off instantly the flow at the leak except for minor flow through the by-pass (if this is permitted in the form of Figures 7 and 8). There will then be no whipping of the broken end of a hose and no danger to the worker either from the broken hose or from the air or gas. Where the by-pass is used, as soon as the leak is repaired, gas flowing through the by-pass will build up the pressure in the remote portion of the conduit under the closed valve and thus when the pressure becomes high enough to balance the pressure on the opposite side of the valve the spring 51 will be enabled to open the valve and the system will automatically be restored to service.

If in any case the spring is not adequate to maintain the valve open in normal operation or is too strong to permit closing in the case of a leak, the valve can be reversed and the spring of different strength at the other end used.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

In a safety valve, a circular body, valve seats at opposite ends of the body, guide means on the body centrally located thereof toward the ends of the body with respect to the valve seats, a stem extending through the guide means, a double valve element mounted on the stem and adapted alternately to close one or other of the valve seats, a by-pass port through the valve element and springs of different predetermined strengths surrounding the stem on opposite ends of the valve element urging the valve element away from the adjoining guide means with different strengths so to permit adjustment of the valve to different conduit flow and pressure conditions by reversal without disassembly.

ASA D. SANDS.

REFERENCES CITED

The following references are of record in the file of this patent:

UNITED STATES PATENTS

| Number | Name | Date |
|---|---|---|
| 546,589 | Doerhoefer | Sept. 17, 1895 |
| 583,037 | Dunham | May 25, 1897 |
| 693,133 | Hennebohle | Feb. 11, 1902 |
| 1,509,508 | Grunwald | Sept. 23, 1924 |
| 1,698,156 | Dorsey | Jan. 8, 1929 |
| 1,707,781 | Blanchard | Apr. 2, 1929 |
| 1,870,484 | Basta | Aug. 9, 1932 |
| 1,956,010 | Diescher | Apr. 24, 1934 |
| 2,055,182 | Schultz | Sept. 22, 1936 |
| 2,121,936 | Thomas | June 28, 1938 |
| 2,163,925 | Wagner | June 27, 1939 |
| 2,197,271 | Kerrick | Apr. 16, 1940 |
| 2,223,994 | Johnson | Dec. 3, 1940 |
| 2,310,636 | Howard | Feb. 9, 1943 |
| 2,311,955 | Merker | Feb. 23, 1943 |
| 2,356,410 | Krugler | Aug. 22, 1944 |

FOREIGN PATENTS

| Number | Country | Date |
|---|---|---|
| 500,420 | Great Britain | of 1939 |